(12) United States Patent
Hill

(10) Patent No.: US 6,484,333 B1
(45) Date of Patent: Nov. 26, 2002

(54) FIRE RETARDANT LAP PROTECTION CLOTH

(75) Inventor: Ronald Hill, 741 E. Mitchell Ave., Cincinnati, OH (US) 45229

(73) Assignee: Ronald Hill, Cincinnati, OH (US)

( * ) Notice: Subject to any disclaimer, the term of this patent is extended or adjusted under 35 U.S.C. 154(b) by 39 days.

(21) Appl. No.: 09/671,832

(22) Filed: Sep. 25, 2000

(51) Int. Cl.[7] .................................................. A47G 9/00
(52) U.S. Cl. ................................... 5/483; 5/482; 2/49.4
(58) Field of Search ........................... 5/482, 500, 483, 5/484, 502; 2/49, 49.4, 69, 69.5, 46, 51, 48

(56) References Cited

U.S. PATENT DOCUMENTS

| | | | | |
|---|---|---|---|---|
| 2,980,169 A | * | 4/1961 | Campbell | 5/417 |
| 4,514,870 A | * | 5/1985 | Tyler, Jr. | 5/485 |
| 5,075,897 A | * | 12/1991 | Daniels | 2/49.1 |
| 5,181,275 A | * | 1/1993 | Spulgis | 2/48 |
| 5,530,968 A | * | 7/1996 | Crocket | 2/46 |
| 5,881,382 A | * | 3/1999 | Bernard et al. | 2/49.4 |
| 5,956,763 A | * | 9/1999 | Blackshear | 2/46 |
| 6,095,058 A | * | 8/2000 | Earnhart | 2/48 |

* cited by examiner

Primary Examiner—Alexander Grosz

(57) ABSTRACT

A fire retardant lap protection cloth (10) to be placed across the lap of the driver or passenger of a vehicle to protect clothing and vehicle seats from tobacco burns or soiling includes a fire retardant material dimensioned to substantially cover the lap to interrupt debris dropping thereon. A binding material (20) placed on top of the cloth and stitched around the edges, giving it a bordered of framed look. A backing material (35) made of 100% cotton muslin, sewn so as to attach all components of the fire protection cloth together, to form a single piece of material. A layer of foam material (30) ¼ inch thick, placed between the cloth material (10) and the backing material (35). A torso flap (50) designed to rest against the lower torso or stomach of the user. Two end flaps (55) to ensure proper placement and fit of the protection cloth.

3 Claims, 3 Drawing Sheets

FIRE RETARDANT LAP PROTECTION CLOTH

LIST OF PRIOR ART PATENTS

1. U.S. Pat. No. 4,514,870—April 1985—Tyler—Fire protection blanket
2. U.S. Pat. No. 5,075,997—December 1999—Daniels—Multi-purpose protection garment
3. U.S. Pat. No. 5,956,763—September 1999—Blackshear—Disposable bib w/lap protector
4. U.S. Pat. No. 5,181,275—January 1993—Spulgis—Apron
5. U.S. Pat. No. 5,530,968—July 1996—Crocket—Commuter's apron

BACKGROUND—Field of Invention

This invention relates generally to fire retardant cloths and more particularly, to a fire retardant cloth positioned upon a seated user's lap to catch and retain debris dropping thereon.

BACKGROUND—Description of Prior Art

Individuals who smoke or eat while driving or sitting within vehicles often have debris such as food of lighted tobacco products, drop onto their clothing or vehicle seat. Such debris usually fall upon the seated person's lap, soiling their garments, burning tobacco from cigarettes, cigars, or pipes in addition to ruining clothing or a vehicle seat cover, may injure the user.

Drivers who smoke or eat while driving tend to jeopardize safe vehicle operation since part of their concentration that would otherwise be completely devoted to assure safe driving is focussed upon the food or tobacco being consumed. If burning tobacco or hot food or liquid fall upon the driver's lap, the driver must immediately direct his or her attention to the problem and temporarily disregard surrounding traffic and driving conditions, often with tragic consequences.

It is accordingly an object of the present invention to provide a fire retardant lap protection cloth for covering the lap and lower torso of a seated driver or passenger to prevent burning or soiling of garments or of the vehicle seat by falling food, liquid or lighted tobacco products and to maintain easy use of vehicle seat belts.

Therefore, inventors created several types of protection devices to try and solve this problem. U.S. Pat. No. 4,514,870 to Tyler (1985) discloses a blanket which, covers the lap and entire leg area of the driver or passenger, using said blanket, making it confining and ackward to use, fisher notice a first and second fastening strips (40), (42) respectively attached to an upper corner of the fabric or foam layer and an arm rest (44) anchor the blanket to the arm rest to prevent unintentional removal of the blanket from the vehicle, also said foam backing layer (30) makes the blanket less able to fold neatly and compactly for storage, also noted, where most debris fall first when one is driving is the torso or stomach area, debris usually fall in this area first and them roll or spill downward to the lap area, said blanket does not tend to offer coverage of this area.

Although other inventors attempted to cover this area looking for a better protection device, they too have come up short with a truly marketable device that is easy to use, comfortable and non-confining, decorative, pleasing to the eye, easy to fold to a small dimension, package, store compactly and can be used almost anywhere.

Several types of inventions have been proposed, for example, U.S. Pat. No. 5,956,763 disposable bib with tap protector, and U.S. Pat. No. 5,075,897 multi-purpose protective garment. While these devices may offer a reasonable amount of protection, they are still using fastening or strapping, or securing devices to secure the device to the driver or passenger, making them extremely uncomfortable and making it harder to use their seat belts, they do not provide easy use of product and can not be folder to a small enough dimensioned size to be used and carried almost anywhere.

SUMMARY

In accordance with the present invention a lap protection cloth for covering the lap and lower torso of a seated driver of passenger while using his of her seat belt, to prevent burning or soiling of garments or vehicle seats by falling food, liquid of lighted tobacco products.

OBJECTS AND ADVANTAGES

Accordingly, besides the objects and advantages of the lap protection cloth described in my above patent application, several objects and advantages of the present invention are:

(a) to provide a protective cloth with no snaps, wires, or fastening devices for anchoring or confining the user of the cloth
(b) to provide a protective cloth that works very well with the use of vehicle seat belts which is mandatory in today's society
(c) to provide a protective cloth that is easily removed in cases of emergency exiting of vehicle
(d) to provide a protective cloth that is light weight for comfort, decorative and appealing to the eye
(e) to provide a protective cloth that can be folded to a small enough dimension for easy and compact storage within the vehicle or cared with the person anywhere
(f) to provide a protective cloth that is easily marketable, inexpensively made, and provides a safe amount of protection for garments and vehicle seats
(g) to provide a protective cloth that is versatile enough to be used almost anywhere, (ie) in the home, at picnics, outdoor concerts, restaurants, and the work place Still other objects and advantages of the present invention will become readily apparent to those skilled in this art from the following detailed description, wherein I have shown and described only the preferred embodiments of the invention simply by way of illustration of the best mode contemplated by me of carrying out my invention. As will be realized, the invention is capable of modifications in various respects, all without departing from the invention. Accordingly, the drawings and description are to be regarded as illustrative in nature, and not as restrictive.

DRAWING FIGURES

In the drawings

FIG. 1 shows a front view of the lap protection cloth, showing the shape of the cloth, the binding, which is stitched around the edges of the cloth to give it a bordered or framed look, the foam material used to prevent the transfer of heat from lighted tobacco or hot liquids to the garment (or in case of short pants or skits being worn) or skin of the individual using it, and an example of the silk-screening or embroidery work applied to the cloth.

FIG. 3 also shows the torso flap and two end flaps of said fire retardant protection cloth.

REFERENCE NUMERALS IN DRAWINGS

Figure 1:
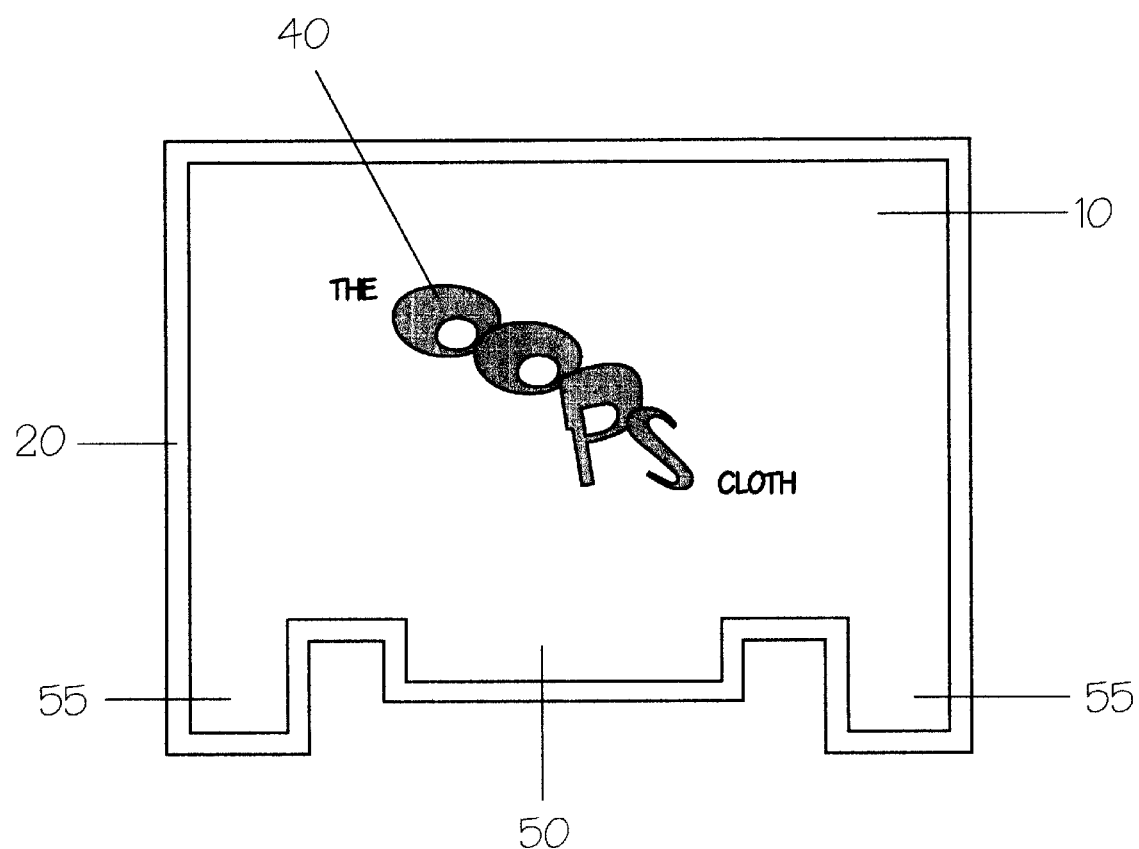

10 Fabric (denim material)
20 Cotton or Rayon or Polyester Binding
30 Foam Material
35 Backing Material
40 Silk-screening or Embroidery Design
50 Torso Flap
55 End Flaps

DESCRIPTION FIG. 1 AND FIG. 3

A preferred embodiment of the lap protection cloth 10 is constructed from a piece of 10–12 ounce weight denim material, measuring 26 inches by 20 inches, the bottom of the cloth on both sides, towards the middle is 6 inches, there is a 1½ inch gap on each side to allow the protection cloth to lay comfortably on the thighs, the torso flap measures 11 inches across, so as to rest against the lower torso or stomach with case. The binding 20 is ½ inch wide and encompassed the outer edge of the entire protection cloth 10, said binding being either cotton, rayon, or polyester prefrerred.

The foam layer 30 is positioned between the denim material 10 and the backing material, cotton muslin 35 and stitched directly upon the entirety of all sides of said materials, said foam layer is a standard foam, used for paring or wrapping fragile goods for shipping, said foam layer is ¼ inch thick and has overall dimensions of 25 inches by 19 inches and is cut to fit denim material 10 and backing material, cotton muslin 35.

The backing layer material 35 is 100% cotton muslin preferred, said backing layer material is cut to the dimensions of 26 inches by 20 inches and is stitched directly to foam material 30 and denim material 10.

ADDITIONAL EMBODIMENTS

The silk-screening or embroidery graphics or lettering 40 is standard paint used for printing and designing on tee shirts, caps and other types of fabrics.

ADVANTAGES

From the description above a number of advantages of my fire retardant protection lap cloth become evident:

(a) The lap protection cloth will provide a superior surface for labeling, embroidery, or screen-printing, either by hand or by machine.

(b) Any alteration or exclusions of this cloth will be highly visible and easily distinguishably marked.

(c) The presence of a fire retardant and liquid protection solution will provide life long and minimal cost.

(d) The lap protection cloth is very light weight, easily removable, and can be folded to a small enough dimension to be carried almost anywhere.

OPERATION

The manner of using the lap protection cloth is to simply place the cloth across your lap once seated, making sure to position the torso flap 50 comfortably against the stomach area, with the end flaps 55 extending toward the rear. The 1½ inch cut on both sides of the cloth allows for perfect positioning. The lap protection cloth will rest comfortably and securely across your lap with or without the use of the vehicle seat belt.

Figure 2:
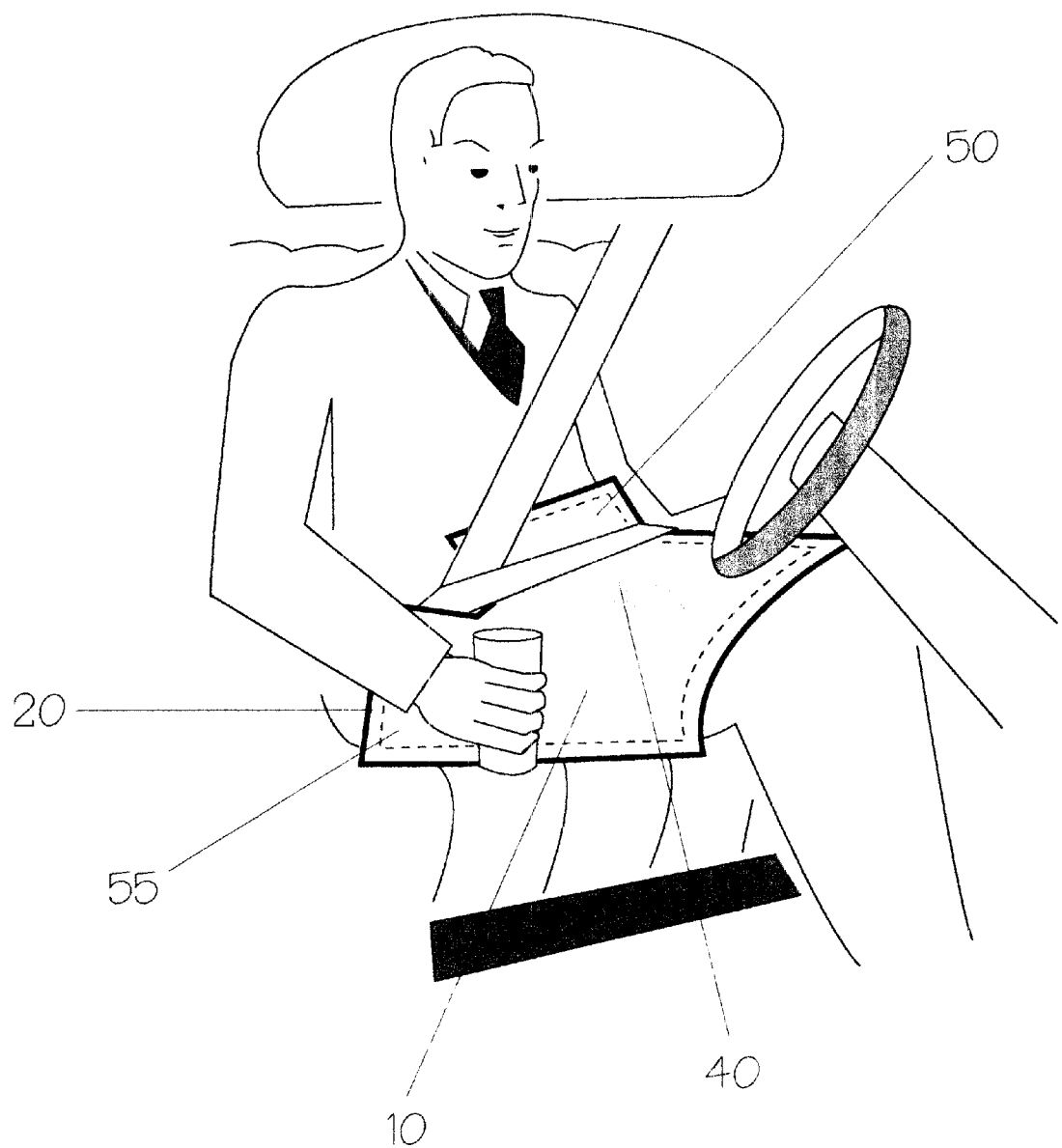
FIG. 2 is a prospective view of the fire retardant lap protection cloth in accordance with the present invention, covering the lap of a seated individual.
Figure 3:
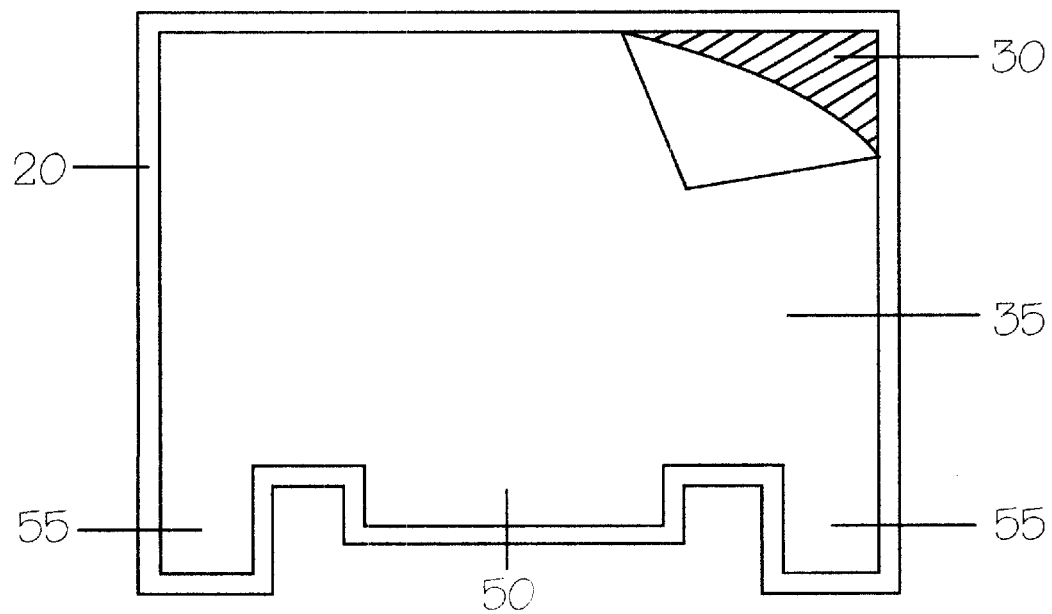
FIG. 3 is a back view of the fire retardant lap protection cloth showing the backing material which is 100% cotton muslin, said material is sewn to the fabric and foam material making it all one piece.
Figure 4:
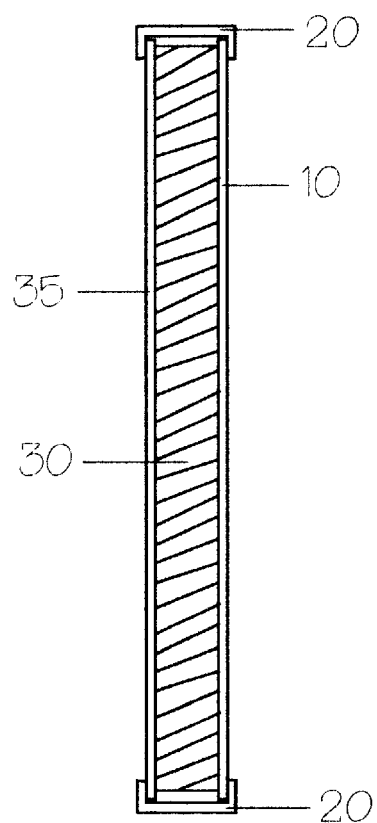
FIG. 4 is a cross sectional view of the cloth of FIG. 3.

As shown in FIG. 2, when properly positioned, the lap protection cloth form a natural depression between the user's legs and thighs, making the protection cloth most effective at catching debris and very comfortable, with the proper usage of the vehicle seat belt, the lap protection cloth becomes secure.

To remove debris and the protection cloth, unbuckle the vehicle seat belt, fold the two end flaps 55 together, holding the cloth in one hand and simply discard debris in a suitable container.

CONCLUSION, RAMIFICATIONS, AND SCOPE

Accordingly, the reader will see that the lap protection cloth can be safely and easily used to catch and prevent debris from soiling garments and vehicle seats, furthermore, the lap protection cloth has additional advantages in that it has no fastening devices to bind or restrict the movements of the user, making it simple and easier to use than other protection devices.

it is easily compacted, stored, and transported it is easy to manufacture, market and sell it can be personalized to be as decorative as one desires it to be it provides a safe and substantial amount of protection to garments and vehicle seats from debris it provides long lasting protection for years.

Although the description above contains many specifications, these should not be construed as limiting the scope of the invention but as merely providing illustrations of some of the presently preferred embodiments of this invention. For example, the protection cloth can be made from a different weight of material or a different material altogether, it could be made without using the foam material used or the backing material that is used, etc. Thus the scope of the invention should be determined by the appended claims and their legal equivalents, rather than by the examples given.

I claim:

1. A flexible, generally rectangular cloth adapted for placement on a seated user's lap, having two long and two short sides, comprising:

a) an upper piece of fire retardant and moisture repellant material dimensioned to substantially cover the seated user's lap;

b) a layer of backing material attached to the lower surface of said upper fire retardant and moisture repellant material;

c) a layer of foam material sandwiched between said upper and lower materials;

said cloth including a cut out portion located in a long side of said cloth, spaced from the short sides of said cloth, said cutout portion dimensioned in a way to define a torso flap adapted to bend upwardly and rest against the lower torso or stomach of a user, and two end flaps adapted to bend downwardly and provide proper placement and fit of the cloth upon the lap of a user.

2. The cloth of claim 1, further comprising a binding around the edges of the cloth.

3. The cloth of claim 1, further comprising wording or graphics on the upper piece of fabric.

* * * * *